Aug. 22, 1944.  H. RAUH  2,356,429
CARRIAGE CONTROL FOR ACCOUNTING MACHINES
Filed Dec. 8, 1939  4 Sheets-Sheet 1

Inventor:
H. Rauh

Aug. 22, 1944.          H. RAUH          2,356,429
CARRIAGE CONTROL FOR ACCOUNTING MACHINES
Filed Dec. 8, 1939          4 Sheets-Sheet 2
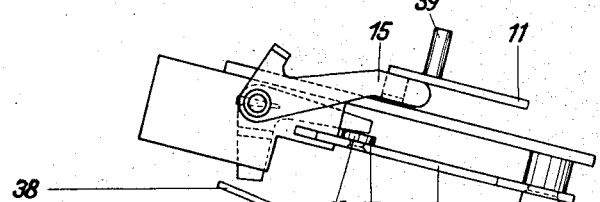
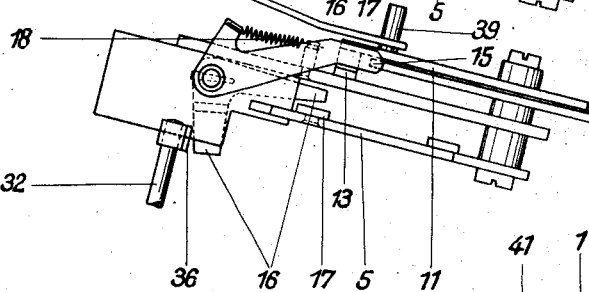
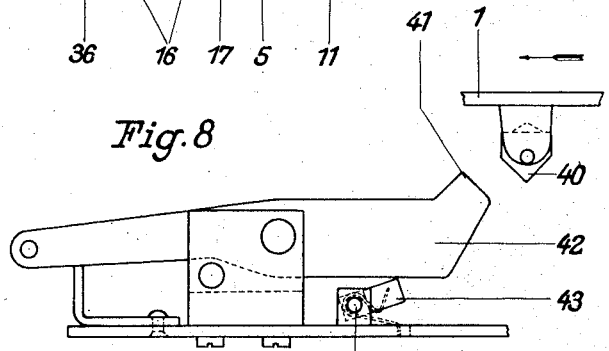
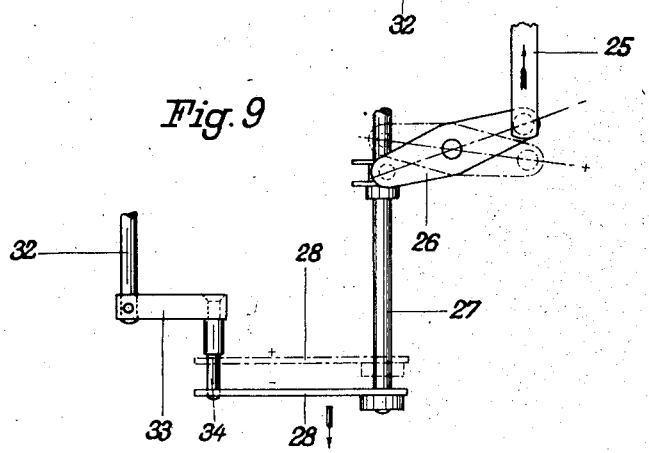

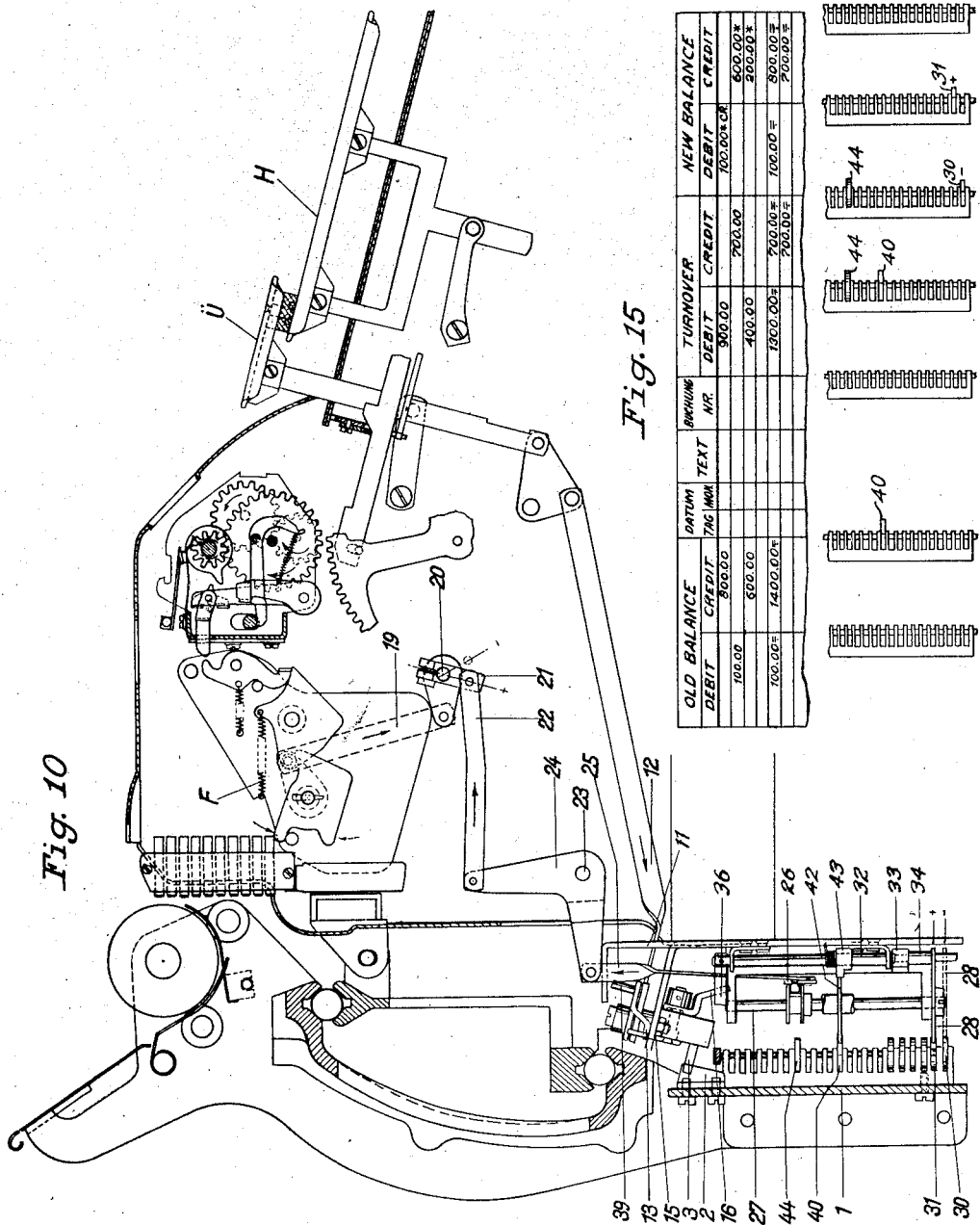

Patented Aug. 22, 1944

2,356,429

UNITED STATES PATENT OFFICE 2,356,429

CARRIAGE CONTROL FOR ACCOUNTING MACHINES

Hermann Rauh, Berlin-Zehlendorf, Germany; vested in the Alien Property Custodian Application December 8, 1939, Serial No. 308,261
In Germany January 17, 1939

4 Claims. (Cl. 235—60)

This invention relates to a special control of the paper carriage of accounting machines in order to automatically shift such carriage from the debit and credit transaction columns to the new balance debit and credit columns.

In accounting machines in which there are old balance debit and credit columns, transaction debit and credit columns and new balance debit and credit columns together with data columns, it is necessary to shift the carriage to the proper new balance debit or credit column in accordance with the new balance appearing in the totalizer after every entrance into the transaction column.

An object of the invention, therefore, is to provide means whereby when the totalizer shows a plus balance after the entry of a transaction item, the paper carriage is automatically skip tabulated from the transaction debit column to the new balance credit column.

It is also an object of the invention to provide means whereby when the totalizer shows a minus balance, the carriage is moved automatically from the transaction credit column to the new balance debit column.

A further object of the invention is to provide means whereby when the carriage is positioned at the transaction credit column and the totalizer indicates a plus balance, that the carriage is automatically skip tabulated directly after the bringing of the transaction item from such transaction credit column to the new balance credit column.

A further object of the invention is to provide means whereby when the paper carriage is located at the transaction credit column and the totalizer shows a minus balance that the carriage, after the printing of such transaction item, is directly and automatically skip tabulated from the transaction credit column to the new balance debit column.

A further object of the invention is to provide means whereby the tabulation and skip tabulation of the carriage is controlled by the fugitive one entry mechanism.

With the above and other objects in view which will become apparent from the detailed description below, the invention is disclosed in the drawings in which:

Figures 5, 6 and 7 are top plan views of the above mechanism in different positions.

Figure 8 is a plan view of a tabulation control means for terminating skip tabulation.

Figure 9 is an elevational view of a portion of the means for selectively determining the end of a skip tabulation in accordance with the balance appearing in the totalizer.

Figure 10 is a general cross-sectional view showing the elements under the control of the tab and skip-tab motor keys.

Figure 15 illustrates one form of ledger sheet adapted for use in the machine in conjunction with a partial view of the control abutments.

The tabulation means will first be described. This mechanism is shown in Figures 1 to 4 inclusive.

I

*Tab motor key H tabulation*

Figure 1:
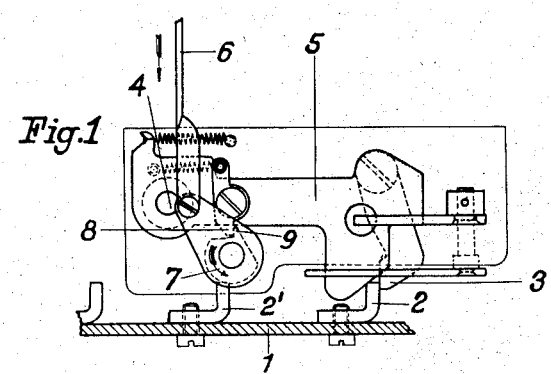
Figure 1 shows an elevation of the mechanism controlled by the tab motor key in the normal position of the carriage.
Figure 2:
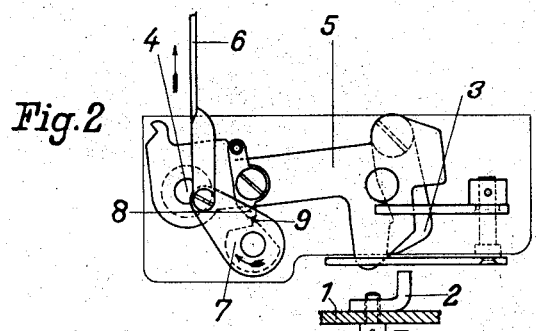
Figure 2 is a similar view of such mechanism illustrating the tabulation position of such mechanism.

As shown in Figures 1 and 2 a stop bar 1 fixed to the paper carriage carries the stops 2 and 2'. In the inoperative position the carriage is held by the tappet 3 cooperating with the stop 2. The tappet 3 is mounted on a lever 5 which oscillates about a pin 4 and the lever 5 is directly controlled by the tab motor key H. Upon a calculating operation of the machine, the lever 5 is swung about pin 4 into the position shown in Figure 2. Such an actuation of the lever 5 may be effected by a bar 6 through the intermediary of an eccentric disk 7 which first oscillates the pawl 8 mounted on the lever 5 in clockwise direction against the action of the spring cooperating with such pawl. Such actuation of the pawl 8 does not move the lever 5. However, upon the return movement of the disk 7 as shown in Figure 2, the lug 9 provided upon the disk 7 lifts the pawl 8 and thereby moves the lever 5 to the position shown in Figure 2. This releases the tappet 3 from the stop 2 and the carriage then shifts one step to the next stop 2'. The lever 5, owing to the rotation of the eccentric disk 7, has dropped back in the meantime from the position shown in Figure 2 to that shown in Figure 1 and this brings about the stopping of the carriage.

The operation of the carriage tabulation is as follows: The tab motor key H is actuated. Upon such actuation the bar 6 is moved in the direction of the arrow as shown in Figure 1, and the eccentric disk 7 is oscillated in the direction of the arrow as shown in Figure 1. Upon return of the key the eccentric disk 7 is positively returned by the machine in the direction of the arrow shown in Figure 2, and this oscillation of the disk 7 oscillates the lever 5 since the lug 9 on the disk 7 cooperates with the pawl 8 and the pawl 8 is prevented, by a pin cooperating with the shoulder on the lever 5, from counter-clockwise movement. Clockwise movement of the pawl 8 is, however, permitted by the spring attached to the pawl 8 as shown in Figure 1 without affecting the lever 5. As a result of such movement of the lever 5 the tappet 3 is withdrawn from the stop 2 as shown in Figure 2 and the carriage is released for tabulation. At the end of this return oscillation of the disk 7 the lug 9 has completely passed by the pawl 8 to the position shown in Figure 1 and the lever 5 together with the tappet 3 may again drop back under the influence of the upper spring shown in Figure 1. The tappet 3, therefore, is again positioned in the path of the stops. The carriage, therefore, will be retained by the next stop 2'.

II

*Skip tabulation under the control of skip-tab motor Key U*

Figure 3:
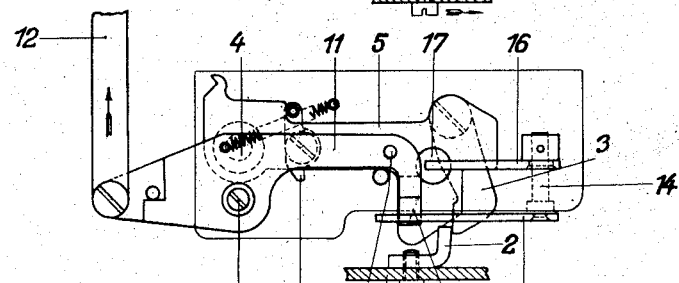
Figure 3 is an elevational view of the mechanism controlled by the tab and skip-tab motor keys in normal position.
Figure 4:
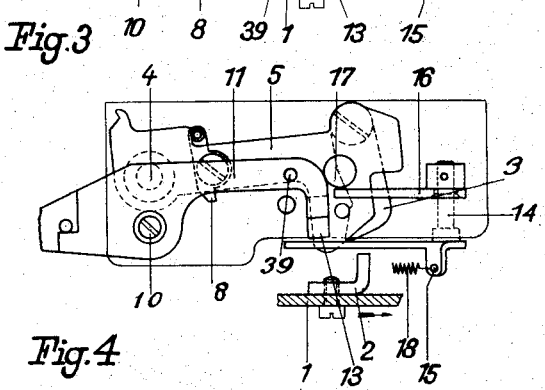
Figure 4 is a similar view with the mechanism in the position occupied upon actuation of the skip-tab motor key.
Figure 11:
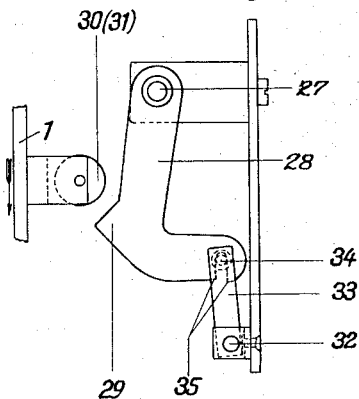
Figure 11 is a plan view of a portion of the means for selectively terminating skip tabulation.
Figure 12:
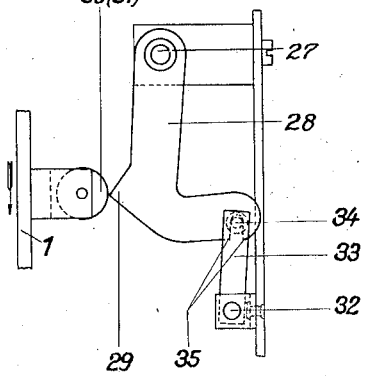
Figure 12 is a view similar to Figure 11 with the parts in a different position.

Upon actuation of the skip-tab motor key U, skip tabulation takes place. As shown in Figures 3 and 4, see also Figures 5 to 7, a lever 11 pivoted upon a pin 10 is provided for skip tabulation above the lever 5. Upon depression of the skip-tab motor key the lever 11 is oscillated to the position shown in Figure 4 by means of a bar 12.

The lever 11 is provided with an extension 13 which extends in front of the lever 15 oscillating about an axle 14. The extension 13 locks the lever 15 in normal position. When the lever 11 has been oscillated to the position shown in Figure 4, the lever 15 is free to oscillate about the axle 14. In Figure 5 the levers 15 and 16 are shown in inoperative position and in Figures 6 and 7 the mechanism is shown in disengaged position.

A lever 16 is also mounted on the axle 14 of the lever 15 which is designed to cooperate with a cam 17 fixed on the lever 5. When the lever 15 is freed upon oscillation of the lever 11 the lever 15 moves until the lever 16 bears against the end face of the cam 17. In such position the lever 5 is still maintained in its inoperative position. If, however, the lever 5 is lifted by the elements 7, 8 and 9 as previously described the levers 15 and 16 may oscillate still further under the action of the spring 18, see Figures 5, 6 and 7, until the lever 16 comes to rest in front of the cylindrical face of the cam 17 as shown in Figure 7. The lever 5 is then locked in the position to which it was moved as shown in Figures 2 and 4 and skip tabulation of the carriage may take place until other control elements come into operation.

These control elements are shown in Figures 8, 10 and 5.

Upon the carriage control bar 1 there is provided a cam 40, see Figure 8, which upon contacting the nose 41 of a lever 42, moves such lever toward the rear. The rear side of the lever presses at the same time against a lever 43 resiliently mounted on a shaft 32 and turns such lever in a clockwise direction, see Figure 8. A lever 36 fixed on the upper end of the shaft 32, see Figure 10, then presses against the lever 16, see also Figure 5, and oscillates the levers 16 and 15 to the left, Figure 10. This frees cam 17 and the lever 5 is again liberated so that the tappet 3 comes again into the path of stop 2 and the movement of the carriage is stopped at the next following stop.

The operation as set forth above in section I is the same only in this case the machine is set into operation by means of the skip-tab motor key U. This results in the extension 13 of lever 11 releasing the locking levers 15 and 16 so that lever 16 may, upon the resultant oscillation, fall in back of the cam 17 and thereby prevent the lever 5 and the tappet 3 from dropping back into the path of the stops upon the carriage control bar 1. The carriage will, therefore, skip tabulate until the levers 15 and 16 are turned counter-clockwise through the action of the cam 40 upon the elements 41, 42, 43, shaft 32 and lever 36. Through the operation of these elements the lever 5 is released and the tappet 3 may again fall into the path of the stops on the carriage control bar 1. Such release of the lever 5 is duly effected before reaching the stop of the desired column and the stopping of the carriage therefore in skip tabulation depends upon the cam 40.

In other words, the difference between the tabulation according to section I above and the skip tabulation as here set forth resides in the fact that in the first case the lever 5 drops back immediately, while in the latter case skip tabulation proceeds until the proper associated column is reached.

III

*Selective skip tabulation*

Selective skip tabulation will first be described when initiated by the skip-tab motor key when the machine is positioned at the transaction or turnover columns.

In accordance with the invention the paper carriage is controlled for skip tabulation by the fugitive one entry mechanism of the totalizer automatically and directly from a transaction column to the associated new balance column. This mechanism is illustrated in Figures 9 to 12 inclusive and 15. Reference is made to Figures 1 to 8 of my copending application, Serial No. 308,260, filed December 8, 1939, for an explanation of the fugitive one entry mechanism.

If a fugitive one transfer entry occurs a lever 21 mounted on a shaft 20 which is the shaft for the fugitive one entry mechanism, is oscillated by the rod 19, see Figure 10. The lever 21 reciprocates a bar 25 through the intermediary of the links 22 and the bell crank lever 24 oscillatingly mounted upon pin 23. The bar 25 is moved downwardly when the fugitive one entry is negative. The bar 25 lowers or lifts a shaft 27 through the intermediary of an oscillatable lever 26 and an arm 28 fixed to the shaft 27 is moved either into the full line position shown in Figure 9, for a minus balance in the totalizer, or into the position shown in dotted lines for a plus balance in the totalizer. See also Figures 10, 11 and 12. The arm 28 has a projection 29 thereon which is brought into the path of either a roller 30 or a roller 31. See also Figure 15. The rollers 30 and 31 are mounted upon the control bar 1 of the carriage. If the arm 28 is in the path of the roller 30 or 31, such arm is oscillated when the control bar 1 is shifted in the direction of the arrow in Figure 11, to the position shown in Figure 12. This will cause rotation of the shaft 32 by means of the lever arm 33 fixed on the shaft 32 and a pin 34 on the lever 33 engaging in a slot 35 provided in the arm 28. The shaft 32, see Figure 10, has mounted thereon an arm 36 which contacts the bell crank lever 16, see Figure 5 and lever 15 is lifted. This unlocks lever 5 so that lever 5 may drop back into the position shown in Figures 1 and 3 and tabulation is stopped.

The operation of the carriage control from a transaction column into a column corresponding to the totalizer total and the balance, is as follows: If after the bookkeeping the debit or credit is to be recorded in the corresponding column in accordance with the totalizer indication of the new result then the machine must be actuated in the transaction column by means of the skip-tab key U. The skip tabulation with respect to one or two columns is initiated in the same way as described in section II above. The release of lever 5, however, is not effected by the cam 40, but by the rollers 30 or 31 corresponding to the column. These rollers which are arranged in accordance with whether a plus or minus balance is being dealt with coact with the projection 29 of the lever 28 which lever 28 assumes either a lower or upper position depending upon the fugitive one entry mechanism. The movement of the lever 28 is transmitted by means of the pin 34 and lever 33 to the same shaft 32 which is actuated by the lever 42 and the cam 40 as set forth in section II above.

The difference between the tabulation according to section II above and the above described operation, is that in the first case the release of the lever 5 is brought about by a fixed adjusted cam 40 while in the second case, such release is effected by means of a lever 28 which in turn is adjusted by the fugitive one entry mechanism.

The skip tabulation of the machine from a transaction column to a new balance column as initiated by the tab-motor key will now be described.

It has been explained above how the locking of the lever 5 carrying the tappet 3 into the inoperative position which takes place upon operation of the skip-tab motor key, is unlocked indirectly from the fugitive one entry mechanism of the totalizer so that the carriage is skip tabulated to the proper associated column in the new balance columns.

Figure 13:
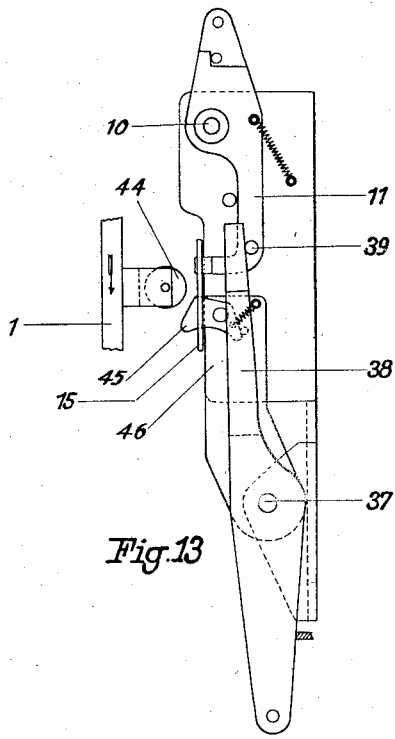
Figure 13 is a plan view of the means for initiating skip tabulation upon actuation of the tab motor key at the transaction columns.
Figure 14:
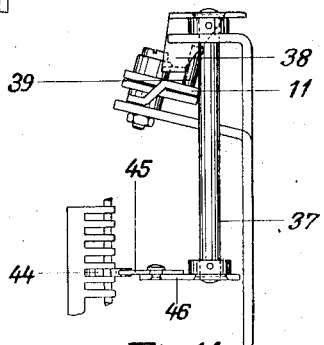
Figure 14 is an elevational view of the mechanism shown in Figure 13.

If the tab-motor key is erroneously depressed then as described above under section I, the carriage would carry out only one step tabulation and in such case skip tabulation to the proper associated column in accordance with the fugitive one entry mechanism could not be carried out. In order to avoid this disadvantage there is provided a separate control 44 on the carriage control bar 1 for each of the transaction columns, see Figures 13, 14 and 15. This control 44 will bring about the same effect as would be initiated by a depression of the skip-tab motor key, that is the lever 11 with its extension 13 is oscillated back in order that the lever 5 after tabulation has taken place, may move to the inoperative position. The control elements which are necessary for this operation are located partly in front of those shown in Figure 10 and are illustrated particularly in Figures 13 and 14.

An arm 38 oscillatable about a shaft 37 is oscillated in clockwise direction by means of the roller 44, the pawl 45, the lever 46 and the shaft 37 when the carriage moves over to the transaction column. The pawl 45 is pivotally mounted upon the lever 46. The arm 38 lifts upon such movement the lever 11 by means of a pin 39 fixed on the lever 11 against which the arm bears. This brings about the locking of the lever 5 in its inoperative position, that is, with the tappet 3 out of engagement with the path of the stops 2. This locking is released as set forth above by the fugitive one entry mechanism of the totalizer by means of the rollers 30, 31, lever 28, pin 34, shaft 32 and lever 36 so that the lever 5 and the tappet 3 drop back into their effective position and stop the carriage in the new coordinated debit or credit column. The same result is obtained as if the skip-tab motor key had been operated.

When the carriage is stationary, the tappet 3 is swung to the right in Figures 1 to 4, and tappet 44 is directly under element 45. Tappet 40 is then positioned a shade past nose 41 in the direction of carriage movement. Therefore, tappet 44 will effectively initiate skip tabulation. During the carriage motion, the tappet 3 is released and swings to the left (Figures 2 and 4). Then, when lever 5 is released by cam 40, the nose of tappet 3 strikes on top of the stop 2 and cannot stop the carriage at that point. The stop 2 accordingly moves along with the carriage and allows lever 5 to drop in the position shown in Figure 3 to engage the following stop 2 after a member such as 40, 30 or 31 has freed locking levers 15 and 16 which, in turn, control stop lever 5.

The lifting and lowering of the bar 25 or the oscillation of the fugitive one entry mechanism shaft 20 in accordance with the fugitive one entry may be effected directly from such fugitive one entry mechanism or indirectly in disengaging a pretensioned spring mechanism F by the fugitive one entry mechanism, see Figure 10, which in turn at release carries out the fugitive one entry transfer and the operations depending on the same.

The foregoing method of operation differs from that described in the first portion of section III in that skip tabulation is automatically initiated through the medium of control roller 44 or in other words the locking of the control lever 5 for skip tabulation is automatically initiated by such roller cooperating with the elements 45, 46, 37, 38 and 39. With regard to the subsequent release of the lever 5, this is effected in the same manner as above described wherein the roller 30 or 31 coacts with the lever 28 and associated parts. It is apparent, therefore, that the transactions may be entered not only by means of the skip-tab motor key U but also through the action initiated by the tab key H. In either case the proper associated balance column will be automatically selected.

I claim:

1. In a bookkeeping machine, the combination comprising a paper carriage, a tab key, means controlled by said tab key for initiating tabulation of said carriage, a skip-tab key, means controlled by said skip-tab key for initiating skip-tabulation of said carriage and means operable upon the actuation of said tab key at certain columnar positions for initiating skip-tabulation of said carriage.

2. In a bookkeeping machine, the combination comprising a paper carriage, a tab key, means controlled by said tab key for initiating tabulation of said carriage, a skip-tab key, means controlled by said skip-tab key for initiating skip-tabulation of said carriage and means operable upon the actuation of said tab key at certain columnar positions for initiating skip-tabulation of said carriage, said last named means including an abutment mounted on said carriage, a pivoted lever actuated by said abutment and means actuated by said lever for controlling said means controlled by said skip-tab key for initiating skip tabulation.

3. In a bookkeeping machine, the combination comprising an algebraic totalizer, a paper carriage, a tab motor key, means controlled by said tab motor key for initiating tabulation of said carriage, a skip-tab motor key, means controlled by said skip-tab motor key for initiating skip-tabulation of said carriage, means operable upon the actuation of said tab motor key at certain columnar positions for initiating skip-tabulation, said last named means including an abutment mounted on said carriage, a pivoted lever actuated by said abutment, means actuated by said lever for controlling said means controlled by said skip-tab motor key for initiating skip tabulation, means for terminating skip-tabulation, including a plurality of abutments mounted on said carriage and means operated by said totalizer cooperating selectively with said plurality of abutments to initiate the termination of skip-tabulation.

4. In a bookkeeping machine, the combination comprising an algebraic totalizer, a paper carriage, a tab motor key, means controlled by said tab motor key for initiating tabulation of said carriage, a skip-tab motor key, means controlled by said skip-tab motor key for initiating skip-tabulation of said carriage, means operable upon the actuation of said tab motor key at certain columnar positions for initiating skip-tabulation of said carriage, means for terminating skip-tabulation, including a plurality of abutments mounted on said carriage and means operated by said totalizer cooperating selectively with said plurality of abutments to initiate the termination of skip-tabulation.

HERMANN RAUH.